(12) United States Patent
Felkins

(10) Patent No.: US 9,135,420 B2
(45) Date of Patent: Sep. 15, 2015

(54) BIOMETRIC DATA-DRIVEN APPLICATION OF VEHICLE OPERATION SETTINGS

(71) Applicant: GM Global Technology Operations LLC, Detroit, MI (US)

(72) Inventor: James F. Felkins, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 13/760,550

(22) Filed: Feb. 6, 2013

(65) Prior Publication Data

US 2014/0218170 A1    Aug. 7, 2014

(51) Int. Cl.
G06F 7/04 (2006.01)
G06F 21/32 (2013.01)
H04Q 1/00 (2006.01)
B60R 25/00 (2013.01)
G10L 17/00 (2013.01)

(52) U.S. Cl.
CPC ..................................... *G06F 21/32* (2013.01)

(58) Field of Classification Search
CPC ....................................................... G06F 21/32
USPC .............. 340/5.82, 825.31, 825.34, 539, 430; 701/35, 29, 32; 704/246
See application file for complete search history.

(56) References Cited

U.S. PATENT DOCUMENTS

| 5,867,802 | A | * | 2/1999 | Borza | 340/5.53 |
| 6,029,102 | A | * | 2/2000 | Elsman | 701/1 |
| 6,078,265 | A | * | 6/2000 | Bonder et al. | 340/5.23 |
| 6,100,811 | A | * | 8/2000 | Hsu et al. | 340/5.83 |
| 6,140,939 | A | * | 10/2000 | Flick | 340/12.28 |
| 6,271,745 | B1 | * | 8/2001 | Anzai et al. | 340/5.53 |
| 6,718,240 | B1 | * | 4/2004 | Suda et al. | 701/36 |
| 6,862,443 | B2 | * | 3/2005 | Witte | 455/345 |
| 6,923,370 | B2 | * | 8/2005 | Gotfried et al. | 235/382 |
| 7,597,250 | B2 | * | 10/2009 | Finn | 235/380 |
| 2010/0097178 | A1 | * | 4/2010 | Pisz et al. | 340/5.72 |
| 2013/0096733 | A1 | * | 4/2013 | Manotas, Jr. | 701/2 |
| 2014/0192194 | A1 | * | 7/2014 | Bedell et al. | 348/148 |

* cited by examiner

Primary Examiner — Nam V Nguyen
(74) Attorney, Agent, or Firm — Cantor Colburn LLP

(57) ABSTRACT

Biometric data-driven application of vehicle operations is implemented by a scanner, a computer processor communicatively coupled to the scanner over a vehicle network, and logic executable by the computer processor. The logic receives, from the scanner over the vehicle network, biometric data for an operator of a vehicle and compares the biometric data from the scanner to sets of biometric data stored in a memory device of the vehicle. Upon determining that the biometric data from the scanner matches one of the sets of biometric data stored in the memory device, the logic retrieves operational settings configured for the operator and implements at least one action to achieve a result defined by the operational settings.

16 Claims, 3 Drawing Sheets

BIOMETRIC DATA-DRIVEN APPLICATION OF VEHICLE OPERATION SETTINGS

FIELD OF THE INVENTION

The subject invention relates to vehicle safety systems and, more particularly, to biometric data-driven application of vehicle operation settings.

BACKGROUND

Advances in vehicle safety systems make vehicles safer to operate, thereby providing increased assurances to drivers. In addition to these advances, there are incentives offered to drivers who have proven safety records (e.g., lowered insurance premiums), which can encourage drivers to practice safe driving techniques.

Families who have multiple operators that share a single vehicle often seek ways to increase the overall safety of the occupants of the vehicle and to encourage safe driving behavior. Likewise, businesses that are responsible for the driving behaviors of their employees with respect to company vehicles often seek out opportunities to increase the safety of their employees and the general public. Young or new drivers are typically less experienced as a population and are subject to more vehicle accidents than are more experienced drivers.

Accordingly, it is desirable to provide a way to provide user-configurable vehicle operation settings based on criteria such as driver age, experience, and/or safe driving history and to identify specific operators for application of these settings using biometric data.

SUMMARY OF THE INVENTION

In one exemplary embodiment of the invention, a system is provided. The system includes a scanner, a computer processor communicatively coupled to the scanner over a vehicle network, and logic executable by the computer processor. The logic is configured to implement a method. The method includes receiving, from the scanner over the vehicle network, biometric data for an operator of a vehicle and comparing the biometric data from the scanner to sets of biometric data stored in a memory device of the vehicle. Upon determining that the biometric data from the scanner matches one of the sets of biometric data stored in the memory device, the method includes retrieving operational settings configured for the operator and implementing at least one action to achieve a result defined by the operational settings.

In another exemplary embodiment of the invention, a method is provided. The method includes receiving, from a scanner over a vehicle network, biometric data for an operator of a vehicle. The biometric data is received at a computer processor communicatively coupled to the scanner. The method also includes comparing the biometric data from the scanner to sets of biometric data stored in a memory device of the vehicle. Upon determining that the biometric data from the scanner matches one of the sets of biometric data stored in the memory device, the method includes retrieving operational settings configured for the operator and implementing at least one action to achieve a result defined by the operational settings.

In yet another exemplary embodiment of the invention, a computer program is provided. The computer program product comprises a computer-readable storage medium having instructions embodied thereon, which when executed by the computer processor causes the computer processor to implement a method. The method includes receiving, from a scanner over a vehicle network, biometric data for an operator of a vehicle. The method also includes comparing the biometric data from the scanner to sets of biometric data stored in a memory device of the vehicle. Upon determining that the biometric data from the scanner matches one of the sets of biometric data stored in the memory device, the method includes retrieving operational settings configured for the operator and implementing at least one action to achieve a result defined by the operational settings.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an exemplary embodiment, biometric data-driven vehicle operations are provided. The exemplary biometric data-driven vehicle operations provide the ability for supervisory control over various vehicle features with respect to particular operators of a vehicle. User-configurable vehicle operation settings identify a particular operator using biometric data that is matched with previously stored biometric data to determine which operational settings to monitor and adjust. By implementing these settings for particular users, the biometric data-driven vehicle operations facilitate safer driving habits, as well as the potential for reduced maintenance and extended life expectancy of the vehicles. There is also the potential for increased security to prevent or reduce theft and vandalism. These and other features of the biometric data-driven vehicle operations will now be described.

Figure 1:
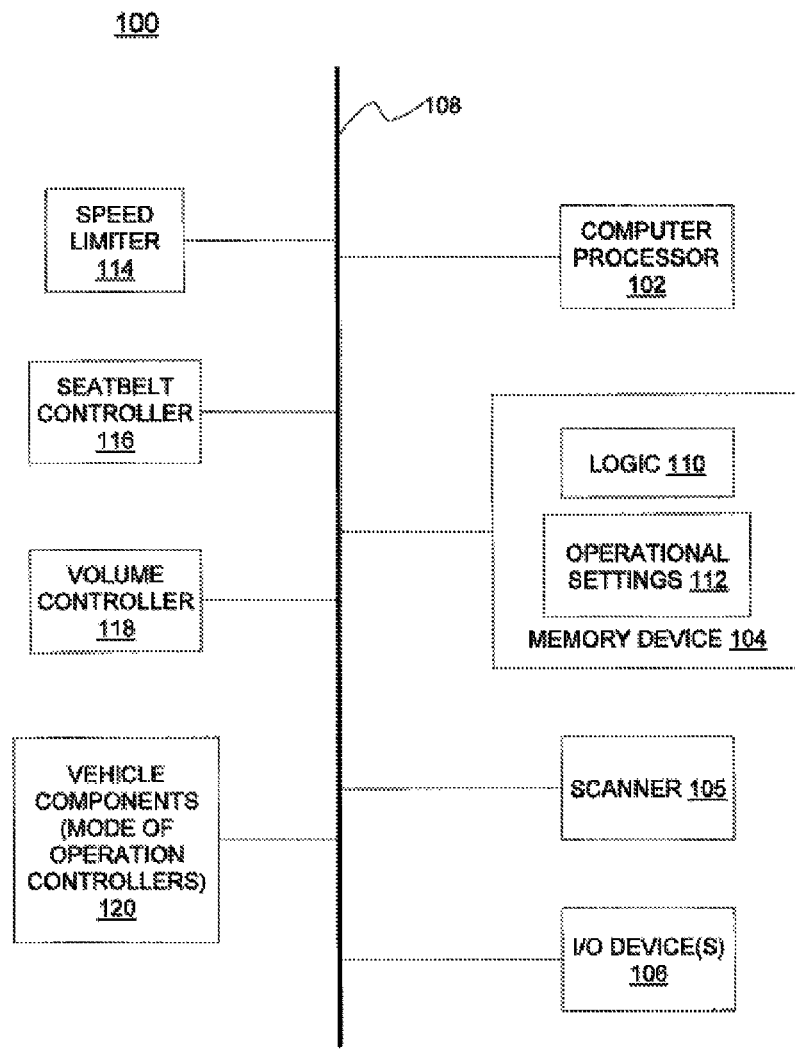
FIG. 1 is a block diagram of a system upon which biometric data-driven vehicle operations may be implemented in accordance with an exemplary embodiment.

Turning now to FIG. 1, a system 100 upon which the biometric data-driven vehicle operations may be implemented in accordance with an exemplary embodiment will now be described. The system 100 is directed to a portion of a vehicle, which vehicle may be any type of automotive vehicle known in the art.

The system 100 includes a computer processor 102, a memory device 104, a scanner 105, and input/output (I/O) devices(s) 106, each of which is communicatively coupled to a vehicle network 108. The computer processor 102 is embedded in the vehicle and may include hardware and related circuitry configured to manage various vehicle elements including vehicle components shown in the system 100 and for communicating therewith. In an embodiment, the computer processor 102 is implemented in part by one or more computer processing units and is part of a body control module of the vehicle.

The memory device 104 may include any type of memory, such as hard disk memory, virtual memory, random access memory, and cache memory. In an embodiment, the memory device 104 stores logic 110 for implementing the biometric data-driven vehicle operations and also stores operational settings 112 as well as biometric data 111, as will be described further herein.

In an exemplary embodiment, a scanner 105 is also communicatively coupled to the network 108. The scanner 105 may be a facial recognition scanner, an eye-tracking scanner, a fingerprint scanner, a voiceprint scanner, or other feature recognition device configured to recognize a feature (or features) that uniquely identifies an individual, including identification to a predetermined probability of certainty. If an eye-tracking scanner is employed, the eye-tracking scanner may be configured to scan an operator's eyes and collect biometric data that can be used to identify the operator during current and future drive cycles. Various characteristics of the operator's eyes that comprise the biometric data may include size, shape, spacing, and color and may collectively form a set of biometric data associated with the operator. The logic 110 is configured to process the biometric data and identify the operator by comparing the captured biometric data to biometric data previously stored in the memory device 104.

The scanner 105 may be disposed in any location of the vehicle that provides maximum quality collection of the biometric data. For example, if an eye-tracking sensor or facial recognition sensor is used, the sensor may be disposed on the vehicle cluster or dashboard. If a fingerprint scanner is used, the fingerprint scanner may be disposed on the steering wheel.

Figure 3:
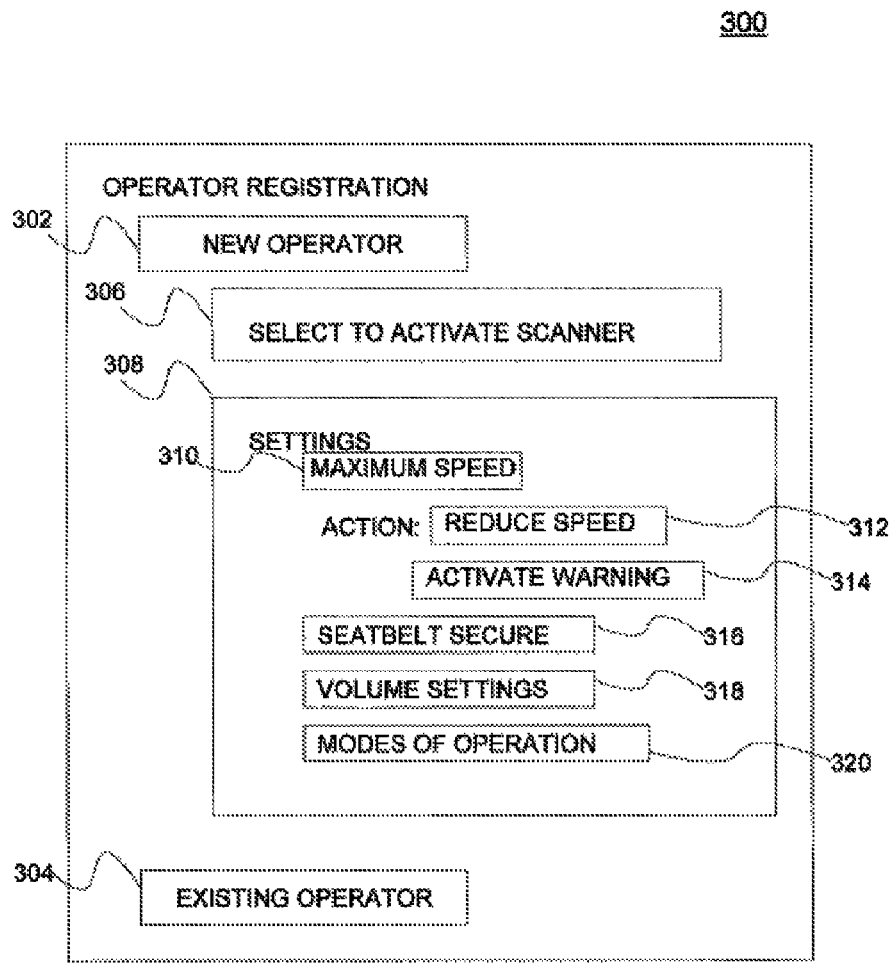
FIG. 3 is a user interface screen for configuring vehicle operation settings in accordance with an exemplary embodiment.

In an embodiment, the biometric data-driven vehicle operations provide an option that allows an authorized user or users to configure particular operational settings 112 for a given operator who may not be an authorized user. Access to configured operational settings 112 may be limited to authorized users using any suitable method to limit systems access including the use of biometric data. In an exemplary embodiment, operational settings 112 include policies that are established by a user with respect to the operation of various vehicle components. Examples of policies include setting or governing a speed limit of the vehicle with respect to a particular operator (or an offset of a detected speed), ensuring the use of seatbelts, controlling the volume level of an audio system in the vehicle, limiting the use of the different modes of operation (e.g., luxury, sport, economy, and touring), and controlling access to applications downloadable via an app store. FIG. 3 illustrates a user interface screen 300 in which the operational settings 112 may be configured by a user and will be described further herein.

In an embodiment, a user may configure operational settings 112 through one or more input devices in the vehicle (e.g., the input/output (I/O) device(s) 106). The I/O device(s) 106 may include input controls, such as buttons or knobs on the vehicle's infotainment system or center stack display device, or may be activated through a voice recognition component, if the vehicle is so equipped, using voice commands from the user. In this embodiment, the I/O device(s) 106 may include a microphone and speakers. The I/O device(s) 106 may be implemented on a display device (e.g., a navigation screen or touchscreen display on the center stack of the vehicle) that is controlled via the infotainment system or other vehicle component. In an alternative embodiment, the operational settings may be configured using other non-vehicular or external devices, such as by a computer operating over the web or by a smart phone.

The biometric data is used to identify the operator of the vehicle, and the operational settings 112 are mapped to the corresponding biometric data associated with a particular operator. The biometric data is utilized by the logic 110 in determining whether to apply configured operational settings 112 to an operator and which configured operational settings 112 to apply. For example, a vehicle owner may designate different features for a new or inexperienced driver (e.g., a teenage driver or new employee) of the vehicle as compared to an experienced driver (e.g., an adult operator or seasoned employee).

The network 108 is integrated with the vehicle and may be part of a physically wired network, a wireless network, or a combination thereof. In one embodiment, the network 108 may be a local area network that communicatively couples electronic components of the vehicle with the computer processor 102. If the network 108 is part of a wireline network, the network 108 may include one or more serial data buses or other data connections.

As shown in FIG. 1, the vehicle electronic components include a speed limiter 114, a seatbelt sensor 116, a volume controller 118, and other vehicle components 120, each of which is communicatively coupled to the vehicle network 108. The speed limiter 114, seatbelt sensor 116, volume controller 118, and other vehicle components 120 may be implemented in hardware, software, or a combination thereof.

The speed limiter 114 may include logic to control (i.e., reduce or limit) a current speed of the vehicle including establishing a maximum speed at which the vehicle may be operated. For example, the speed limiter 114 may include an electronic control unit (ECU) and circuitry that are communicatively coupled to an accelerator, braking device, or a combination thereof. The speed limiter 114 receives signals from the computer processor 102 when a triggering event has occurred, as defined by the operational settings 112. The speed limiter 114, in turn, communicates instructions to an accelerator or braking device of the vehicle, which may include associated controllers such as an engine control module or a vehicle control module, that cause the vehicle speed to be limited to a speed that is within a maximum speed limit set by the operational settings 112. Alternatively, the speed limiter 114 may be configured to adjust the speed of the vehicle based on an offset of a detected speed, as opposed to a fixed speed limit value. In yet another embodiment, the speed limiter 114 may be configured with logic to prevent the speed of the vehicle from exceeding the maximum speed limit.

In an alternative embodiment, upon the occurrence of the triggering event (i.e., the vehicle speed exceeds the maximum speed limit set by the operational settings 112), the speed limiter 114 may include logic to communicate instructions to a warning indicator of the vehicle that causes an audio system to transmit audio signals warning the operator to reduce the vehicle speed. The audio signals may be continuously emitted until the vehicle speed is determined to have been reduced to a speed that is at or below the maximum speed limit set by the operational settings 112. The computer processor 102 receives vehicle speed data from the vehicle to determine the current speed. The audio system and warning indicator may be implemented as an output device (e.g., I/O device(s) 106) and may include beeps, chimes, voice messages, or other audio signals. It will be appreciated that other types of warnings may be implemented via the I/O device(s) 106, such as visual indicators. For example, a text message, graphical icon, or lighting element may be used to implement the warnings.

The seatbelt sensor 116 detects whether a seatbelt is engaged (secured) or disengaged. The seatbelt sensor 116 sends data to the computer processor 102, which in turn may activate a warning (via the logic 110) in the vehicle through an audio system that emits audio signals indicating to the operator that his/her seatbelt is not secured. These audio signals may be continuously emitted until the operator secures his/her seatbelt. The computer processor 102 receives signals from the sensor indicating the status (e.g., engagement or disengagement) of the operator's (and/or passenger's) seatbelt whereby the disengagement of the seatbelt serves as the triggering event when the operational settings 112 have been so configured, which in turn causes the computer processor 102 to communicate instructions to the audio system to activate a warning. Alternatively, the logic 110 may be configured to prevent the operator from engaging the vehicle into an active gear (e.g., drive or reverse) until the seatbelt has been secured. In this embodiment, the seatbelt sensor 116 determines the status of the seatbelt before the operator places the vehicle in drive or reverse and communicates this information to the computer processor 102. Alternatively, the logic 110 may be configured to instruct the speed limiter 114 to limit the speed if the seatbelt is not engaged or becomes disengaged during a drive cycle.

The volume controller 118 may include logic to reduce the volume level of an audio system in the vehicle when the logic 110 determines that a current volume exceeds a maximum volume value defined by the operational settings 112. Alternatively, the logic 110 may be configured to prevent the volume from exceeding the pre-defined maximum volume level. In an embodiment, the volume controller 118 includes an electronic control unit (ECU) and circuitry that are communicatively coupled to an audio system (e.g., vehicle stereo or infotainment system). The volume controller 118 includes a sensor that measures the volume of the stereo and transmits this information to the computer processor 102. The logic 110, in turn, compares this volume data to any maximum volume limit set by the operational settings 112 to determine whether a triggering event has occurred. If the volume limit has been exceeded, the logic 110 instructs the volume controller 118 to reduce the volume of the audio system to a level that is within the maximum volume limit set by the operational settings 112.

Other vehicle components 120 may be adjusted by the logic 110. For example, vehicle components that relate to different modes of operation (e.g., luxury mode, sport mode, touring, and economy) may be controlled via the logic 110 for specified operators. For example, luxury mode and sport mode may cause the vehicle to have higher performance available, including higher engine horsepower or torque, than touring and economy modes. A user may configure the operational settings to de-activate the luxury and sport modes for use by the operator or otherwise limit certain modes.

In addition, other vehicle components 120 may include an option that enables vehicle occupants to access an app store. The app store provides individuals with the ability to download mobile applications or other content (e.g., music, streaming video, etc.) for use in the vehicle. In an embodiment, the logic 110 may be configured to disable the use of the app store option via the operational settings.

Other functions that may be implemented via the logic 110 include external communications that are generated and transmitted when a triggering event occurs. For example, when an operator exceeds a speed limit set by the operational settings 112, the logic 110 may be configured to generate an email, text, or voice message that includes this information and transmit the email, text, or voice message to an authorized entity, e.g., the owner of the vehicle or enterprise employing the operator of the vehicle.

Figure 2:
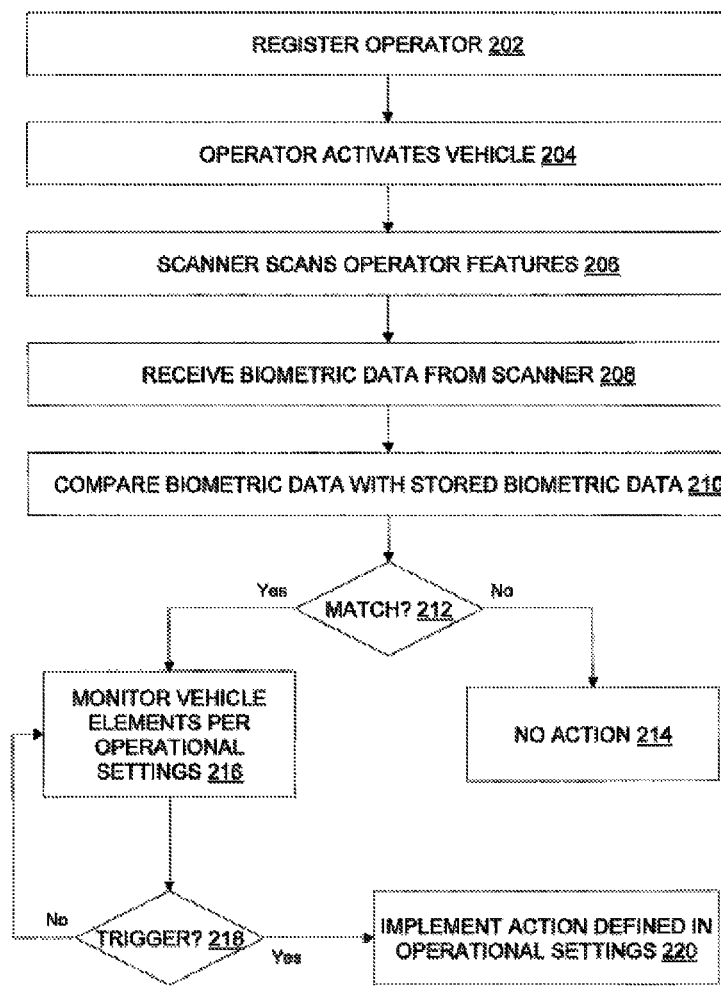
FIG. 2 is a flow diagram describing a process for implementing biometric data-driven vehicle operations in accordance with an exemplary embodiment.

Turning now to FIG. 2, a flow diagram describing a process or method 200 for implementing the biometric data-driven vehicle operations will now be described in an exemplary embodiment. Step 202 describes a registration feature of the biometric data-driven vehicle operations, while steps 204-216 describe the implementation of the user-configurable operational settings configured for a particular operator.

At step 202, a user of the vehicle (e.g., owner) registers an operator (e.g., teenage child) for the biometric data-driven vehicle operations. In an embodiment, this step may be implemented via a user interface provided by the logic 110. For example, a user interface screen with selectable options may be presented on a display device (e.g., I/O device(s) 106). As shown in FIG. 3, a user interface screen 300 illustrates options that enable a user to configure the operational settings 112. As shown in FIG. 3, the user may select NEW OPERATOR 302 or EXISTING OPERATOR 304. By selecting EXISTING OPERATOR 304, the user may edit or delete settings configured for existing operators of the vehicle. Once the user selects NEW OPERATOR 302, the logic 110, via the user interface screen 300, prompts the user to activate the scanner 105 via an option 306. The scanner 105, in turn, scans features of the operator, which are provided to the logic 110 and stored as biometric data in the memory device 104.

As shown in FIG. 3, the user may then select operational settings 112 via a window 308, which lists the configurable operational settings available to the user. The user may select a maximum speed limit via an option 310, a seatbelt setting via an option 316, a volume setting via an option 318, and modes of operation via an option 320.

If the user selects the option 310 for establishing a maximum speed limit, the user interface screen 300 displays two actions 312 and 314. Action 312, if selected, automatically controls the speed of the vehicle pursuant to the maximum speed limit once the logic 110 determines that the vehicle speed has reached this limit. This determination is referred to herein as a triggering event with respect to the maximum speed operational setting. If, however, the user selects action 314, a warning is activated once the vehicle reaches the maximum speed limit. In one embodiment, the warning (e.g., an audio tone, beep, chime, etc.) may be continuously emitted within the vehicle cabin until the logic 110 determines that the speed of the vehicle has been reduced to a value that is below the maximum speed limit.

Once the operational settings 112 have been configured for the operator, the biometric data-driven vehicle operations may be implemented as will now be described in steps 204-220.

At step 204, operator activates the vehicle by turning on the ignition. This activation may in turn cause the scanner 105 to be initiated. Alternatively, the scanner 105 may be activated through selection of the option 306 as described above. At step 206, the scanner 105 scans operator features and collects biometric data. For example, if the scanner 105 is an eye-tracking sensor or facial recognition sensor, the features scanned may be eye and facial characteristics, respectively. If the scanner 150 is a fingerprint scanner, the features scanned include a fingerprint of the operator.

At step 208, the logic 110 receives the biometric data from the scanner 105 and compares the biometric data from the scanner 105 with biometric data that has been previously stored in the memory device 104 at step 210. If the logic 110 does not find a match at step 212, this means no settings have been configured for this particular operator. In this event, the logic 110 takes no further action at step 214.

If, however, the logic 110 finds a match at step 212, this means operational settings 112 exist in the memory device 104 for the identified operator. The logic 110 retrieves the operational settings 112 for the operator and monitors various vehicle elements associated with the policies configured in the operational settings 112 at step 216. The logic 110 monitors the vehicle elements for an occurrence of a triggering event (e.g., seatbelt unfastened, vehicle speed limit exceeded, etc.). If a triggering event has occurred at step 218, the logic 110 implements an action defined by the operational settings 112 at step 220 (e.g., controlling or reducing vehicle speed, emitting a warning regarding the vehicle speed or seatbelt status, controlling the volume of an audio system, etc.). Otherwise, if no triggering event has occurred at step 218, the logic 110 continues to monitor the vehicle elements at step 216.

While the operational settings 112 above are described with respect to particular operators, it will be understood that the operational settings 112 are not so limited. For example, the operational settings 112 may be configured for undetermined operators (e.g., those who are not registered by the owner to operate the vehicle). These may include under-aged individuals, strangers, or others who are not authorized to operate the vehicle. In this embodiment, the operational settings 112 may include a configurable option that, once selected, operates to prevent unregistered individuals from operating the vehicle (e.g., prevents the vehicle from starting even when the key is in the ignition). Thus, if no biometric data is found in the memory device 104 that matches the operator's biometric data, the vehicle is prevented from being activated.

Technical effects of the invention provide biometric data-driven vehicle operations. User-configurable vehicle operation settings provide the ability for supervisory control over various vehicle features with respect to particular operators of the vehicle. The biometric data-driven vehicle operations identify a particular operator using biometric data that is matched with previously stored biometric data to determine which operational settings to monitor and adjust.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A system, comprising:
    a scanner disposed on a vehicle steering wheel;
    a computer processor communicatively coupled to the scanner over a vehicle network; and
    logic executable by the computer processor, the logic configured to implement a method, the method comprising:
        receiving, from the scanner over the vehicle network, biometric data for an operator of a vehicle;
        comparing the biometric data from the scanner to sets of biometric data stored in a memory device of the vehicle;
        upon determining that the biometric data from the scanner matches one of the sets of biometric data stored in the memory device, retrieving operational settings configured for the operator, the one of the sets of biometric data mapped to the operational settings configured for the operator;
        monitoring vehicle operational data for a triggering event caused by exceeding at least one of the operational settings, the operational settings include a speed limit, the triggering event comprising a speed of the vehicle reaching a maximum speed value set by the speed limit; and
        implementing at least one action in response to an occurrence of the triggering event, wherein the at least one action includes generating and transmitting an electronic message to an owner of the vehicle that notifies the owner of the triggering event.

2. The system of claim 1 implementing the at least one action further includes activating a speed limiter resulting in prevention of the vehicle from exceeding the maximum speed value.

3. The system of claim 2, wherein the speed limiter is at least one of an accelerator and brakes.

4. The system of claim 1, wherein the implementing the at least one action further includes activating a warning generator, the warning generator continuously presented until the speed of the vehicle is reduced to a value that is below the maximum speed value.

5. The system of claim 1, wherein the operational settings further include a seatbelt setting, the triggering event comprises the operator initiating a driving event without securing the seatbelt, and the implementing the at least one action further includes activating a warning generator, the warning generator continuously implemented until the seatbelt is secured.

6. The system of claim 1, wherein the operational settings further include a volume limit of an audio system, the triggering event comprises a volume of the audio system exceeding a maximum volume limit, and implementing the at least one action includes activating a volume controller coupled to the audio system resulting in reduction of the volume below the maximum volume limit.

7. The system of claim 1, wherein the logic is further configured to implement:
    registering the operator of the vehicle, comprising:
        receiving, via an input component in the vehicle, a request from a user to register the operator, the request initiated via a user interface of the logic;

prompting the user to activate the scanner for the operator;

receiving the biometric data from the scanner;

storing the biometric data in the memory device;

prompting the user to configure the operational settings for the operator via the user interface; and storing the operational settings with the biometric data in the memory device.

8. The system of claim 7, wherein the input component is a center stack display device in the vehicle, the center stack display device communicatively coupled to the computer processor over the vehicle network.

9. A method, comprising:

receiving, from a scanner disposed on a vehicle steering wheel, over a vehicle network, biometric data for an operator of a vehicle, the biometric data received at a computer processor communicatively coupled to the scanner;

comparing the biometric data from the scanner to sets of biometric data stored in a memory device of the vehicle;

upon determining that the biometric data from the scanner matches one of the sets of biometric data stored in the memory device, retrieving operational settings configured for the operator, the one of the sets of biometric data mapped to the operational settings configured for the operator;

monitoring vehicle operational data for a triggering event caused by exceeding at least one of the operational settings, the operational settings include a speed limit, the triggering event comprising a speed of the vehicle reaching a maximum speed value set by the speed limit; and implementing at least one action in response to an occurrence of the triggering event, wherein the at least one action includes generating and transmitting an electronic message to an owner of the vehicle that notifies the owner of the triggering event.

10. The method of claim 9, wherein the implementing the at least one action further includes activating a speed limiter resulting in prevention of the vehicle from exceeding the maximum speed value.

11. The method of claim 10, wherein the speed limiter is at least one of an accelerator and brakes.

12. The method of claim 9, wherein implementing the at least one action further includes activating a warning generator, the warning generator continuously presented until the speed of the vehicle is reduced to a value that is below the maximum speed value.

13. The method of claim 9, wherein the operational settings further include a seatbelt setting, the triggering event comprises the operator initiating a driving event without securing the seatbelt, and implementing the at least one action further includes activating a warning generator, the warning generator continuously implemented until the seatbelt is secured.

14. The method of claim 9, wherein the operational settings further include a volume limit of an audio system, the triggering event comprises a volume of the audio system exceeding a maximum volume limit, and implementing the at least one action further includes activating a volume controller coupled to the audio system resulting in reduction of the volume below the maximum volume limit.

15. The method of claim 9, further comprising registering the operator of the vehicle, comprising:

receiving, via an input component in the vehicle, a request from a user to register the operator, the request initiated via a user interface of the logic;

prompting the user to activate the scanner for the operator;

receiving the biometric data from the scanner;

storing the biometric data in the memory device;

prompting the user to configure the operational settings for the operator via the user interface; and storing the operational settings with the biometric data in the memory device.

16. A computer program product comprising a computer-readable storage medium having instructions embodied thereon, which when executed by a computer cause a computer to implement a method, the method comprising:

receiving over a vehicle network, from a scanner disposed on a vehicle steering wheel, biometric data for an operator of a vehicle;

comparing the biometric data from the scanner to sets of biometric data stored in a memory device of the vehicle;

upon determining that the biometric data from the scanner matches one of the sets of biometric data stored in the memory device, retrieving operational settings configured for the operator, the one of the sets of biometric data mapped to the operational settings configured for the operator;

monitoring vehicle operational data for a triggering event caused by exceeding at least one of the operational settings, the operational settings include a speed limit, the triggering event comprising a speed of the vehicle reaching a maximum speed value set by the speed limit; and implementing at least one action in response to an occurrence of the triggering event, wherein the at least one action includes generating and transmitting an electronic message to an owner of the vehicle that notifies the owner of the triggering event.

* * * * *